United States Patent
Clark

[11] Patent Number: 6,113,377
[45] Date of Patent: Sep. 5, 2000

[54] MOULD REPLACEMENT AND METHOD OF MOULD REPLACEMENT IN A BLOW MOULDING APPARATUS

[75] Inventor: Roger William Clark, Beaumaris, Australia

[73] Assignee: Continental PET Technologies, Inc., Florence, Ky.

[21] Appl. No.: 09/011,585

[22] PCT Filed: Aug. 22, 1996

[86] PCT No.: PCT/AU96/00524

§ 371 Date: Jun. 2, 1998

§ 102(e) Date: Jun. 2, 1998

[87] PCT Pub. No.: WO97/07965

PCT Pub. Date: Mar. 6, 1997

[30] Foreign Application Priority Data

Aug. 22, 1995 [AU] Australia ............................. PN 4961

[51] Int. Cl.[7] ............................. B29C 33/30; B29C 49/48
[52] U.S. Cl. ............................. 425/195; 29/467; 249/102; 425/522; 425/541
[58] Field of Search ............................. 425/183, 195, 425/522, 541, 192 R; 249/102; 29/464, 467

[56] References Cited

U.S. PATENT DOCUMENTS

| | | | |
|---|---|---|---|
| 3,753,641 | 8/1973 | Turner et al. | 425/541 |
| 3,778,246 | 12/1973 | Rankl | 65/360 |
| 3,843,286 | 10/1974 | Horberg, Jr. et al. | 425/183 |
| 3,912,435 | 10/1975 | Waring | 425/541 |
| 4,072,456 | 2/1978 | Appel et al. | 425/183 |
| 4,150,931 | 4/1979 | Gabrys | 425/186 |
| 4,151,976 | 5/1979 | Schurman | 425/522 |
| 5,255,889 | 10/1993 | Collette et al. | 425/183 |
| 5,571,474 | 11/1996 | Przytulla | 425/183 |

FOREIGN PATENT DOCUMENTS

| | | | |
|---|---|---|---|
| 2505381 | 8/1976 | Germany . | |
| 1-320132 | 12/1989 | Japan | 425/522 |
| 4-18325 | 1/1992 | Japan | 425/541 |
| 2240300 | 7/1991 | United Kingdom . | |

OTHER PUBLICATIONS

Abstract of Japanese reference 4–21426, dated Jan. 1992.
Abstract of Japanese reference 1–320132, dated Dec. 1989.
Abstract of Japanese reference 63–99924, dated May 1988.

*Primary Examiner*—Robert Davis
*Attorney, Agent, or Firm*—Wolf, Greenfield & Sacks, P.C.

[57] ABSTRACT

A moulding member defining a portion of a mould cavity for blow moulding an article in blow moulding apparatus, wherein said moulding member includes: (a) a backing member (5, 19) fixable to said blow moulding apparatus and having a wall which defines a recess in said backing member, and (b) a removable insert (3, 47) located in said recess and having a surface defining a portion of said mould cavity (11), wherein said backing member (5, 19) and said insert (3, 47) are located in register relative to each other by way of cooperating locating means (17, 73) on said insert and said backing member, respectively.

27 Claims, 2 Drawing Sheets

MOULD REPLACEMENT AND METHOD OF MOULD REPLACEMENT IN A BLOW MOULDING APPARATUS

The present invention relates to moulding of articles, in particular it relates to blow moulding apparatus, a novel moulding member and an improved method for mould replacement. It will be convenient to describe the invention with particular reference to blow moulding of containers such as thermoformable polymeric bottles, made for example from polyethylene terephthalate ("PET") although it will be appreciated that the invention may have wider application.

In conventional blow moulding of thermoformable polymeric containers air is used to expand a heated preform against a female mould cavity. The mould cavity is formed by a number of mould parts, the number of mould parts generally depending upon the complexity of the moulded container. The base configuration of the container may be formed from a single mould element and the side walls may be formed from a pair of mould halves. In conventional container blow moulding apparatus the mould halves are each mounted directly to holding arms which reciprocally bring the mould halves together during the blowing phase and separate the mould halves during the bottle ejection and preform loading phase. It may be desired to manufacture a variety of container shapes on one blow moulding apparatus and for each particular container shape a different pair of mould halves and in some cases a different base mould element will be required to define the female mould cavity.

Every time a production run of one particular container shape finishes and a new container shape is to be made with a different side wall configuration or if mould halves become unacceptably worn, it is necessary to remove the mould halves which are bolted to the holding arms and to attach the new mould halves. The mould halves must then be realigned so that they index precisely to properly form the mould cavity and so that they do not damage each other during operation. Numerous retaining bolts are conventionally required to securely hold the mould halves to the holding arms and many of the bolts are difficult to access, particularly with multi-cavity moulding apparatus. Significant time is taken up in accessing and removing these retaining bolts. Mould halves are generally heavy and awkward to hold when being repositioned and as a consequence, re-bolting of the mould halves may also take considerable time.

Disconnection and reconnection of pipes and hoses to mould halves for heat transfer media, which may either cool or heat the mould half, will take further time.

Furthermore, in conventional blow moulding apparatus there is limited scope for adjustment of the holding arms so each mould half must be adjusted in its mounting to the holding arm by way of shims or the like which may often involve trial and error. This again can be time consuming. When combined, all the time consuming factors related to changing mould halves can result in significant production down-time, especially when a blow moulding apparatus has a number of cavities to be replaced. Due to the high speeds at which such blow moulding machines operate, correct alignment of mould elements is critical. With some bottle blow moulding machines having a capacity to produce about 20,000 bottles per hour, this can easily translate to significant lost production—more so when more than one machine needs to have the mould elements changed. Furthermore, once a pair of mould halves becomes worn unacceptably through use the entire mould halves must be replaced. Mould halves may be made from large amounts of metal and to replace the entire mould half can be an expensive exercise.

Accordingly, there is a need for a method of changing mould parts in a blow moulding apparatus to reduce production down-time assuring accurate alignment of substituted mould parts without the need to readjust the apparatus before recommencing production of containers.

It is an object of the invention to provide a solution to one or more of the problems of existing blow moulding apparatus.

According to the present invention there is provided a moulding member defining a portion of a mould cavity for blow moulding an article in a blow moulding apparatus, wherein said moulding member includes:

a) a backing member fixable to said blow moulding apparatus and having a wall which defines a recess in said backing member; and b) a removable insert located in said recess and having a surface defining a portion of said mould cavity, wherein said backing member and said insert are located in register relative to each other by way of co-operating locating means on said insert and said backing member, respectively and further including insert securing means being connectable to said insert and connectable to said backing member and said insert securing means being separate and remote from said cooperating locating means; wherein said insert and insert securing means are adapted to be disconnected from the backing member so that they can both be removed therefrom.

The co-operating locating means preferably consist of a projecting portion and a corresponding recessed portion whereby the projecting portion positively locates in the recessed portion. The projecting portion may be positioned on the inner wall of the backing member and the corresponding recessed portion is thus positioned on an outer surface of the insert which is locatable in the recess. Alternatively the projecting portion may be positioned on the outer surface of the insert and the corresponding recessed portion is thus positioned on the inner wall of the backing member. In either case the projecting portion and the corresponding recess are of complementary dimensions such that when so engaged the backing member and insert are located in register. This obviates the need to realign mould members in the blow moulding apparatus when replacing one or more inserts as the backing members should previously have been aligned during previous blow moulding operations.

Preferably said projecting portion consists of a rib and said recessed portion consists of a corresponding groove although it will be appreciated that the projecting portion and recessed portion may comprise a dowel and a corresponding bore, or some such similar arrangement. More preferably the rib is positioned on and extends circumferentially about the inner wall of the backing member and the recessed portion is positioned on the outer surface of the insert. When the insert is positioned in the backing member, the inter-engagement of the co-operating locating means will thus prevent movement of the backing member and insert relative to each other in at least one direction, i.e. vertically, laterally or rotationally.

In a preferred embodiment where the plastics blow moulding apparatus is used to blow mould containers such as bottles there are provided two opposing side wall forming moulding members and a separate base forming mould member, the sidewall forming mould members having removable inserts as defined above. The base forming mould member may be separately changeable element or it may be a fixed element.

Preferably the insert has an outer surface which locates in the recess of the backing member and abuts the inner wall of the recess. It is desirable to maximise the surface contact between the outer surface of the insert and the inner surface of the backing member in order to maximise heat transfer between the backing member and the insert, the former which may be heated or cooled by a heat transfer medium such as water, so heat dispersion of heat is even and well maintained throughout the insert. Preferably the insert is in the form of a shell being made from the minimum amount of material necessary and is in intimate contact with the respective backing member with minimal gap therebetween.

In a more preferred embodiment the co-operating locating means are configured such that when the insert and backing member are located in register relative to each other the insert and backing member are also secured to each other by the co-operating primary corresponding locating means. In other words the co-operating locating means is configured such that it locates and secures the insert and the backing together rather than simply locating them. In one embodiment the co-operating locating means are slidably engageable members which may be positioned on the outer surface and the inner wall of the insert and backing respectively.

In a most preferred embodiment the co-operating locating means on the insert and backing member are interlocking slidably engageable members preferably positioned on the outer surface of the insert and on the inner wall of the backing member. They may consist of a projecting portion having a chamfered face and a corresponding recessed portion with a chamfered face of complementary dimensions such that the insert, when positioned in the recess in the backing member, is snug and precisely located with minimal clearance between the outer surface of the insert and the inner surface of the backing. In this way the insert is held tightly in the backing member thus the backing member and insert cannot move to damage each other. By wedging the insert and backing member together in this way facilitates good contact between the insert and backing member, which could otherwise result in poor moulding or inadequate thermal transfer between the insert and backing member. In one embodiment the chamfered face in the form of a rib on the backing member may be formed separately from the main body of the backing member and fixed to form part of the backing member by way of suitable securing means such as bolts or screws. When there are two opposing mould members used to blow mould the derived article such as a bottle, the recess in the backing member is preferably semi-cylindrical. Therefore in the preferred embodiment the groove in the insert and the rib on the recess are partially annular in shape and the mating surface of the insert and the recess well of the backing member respectively.

There may further be provided secondary locating means for locating the backing member and the insert. The secondary locating means may consist of a flange on the insert which is locatable in a secondary recess in the backing member. The flange may have a projection having a chamfered face locatable in a corresponding groove in the secondary recess in the backing member which also has a chamfered face such that the two chamfered faces wedge upon each other to secure and locate the flange into the groove in a similar fashion to the preferred embodiment of the co-operating locating means. The flange may be integral with the insert, or alternatively it may be separately detachable from the insert.

In this latter embodiment the flange must be capable of being fixed to both the backing member and the insert simultaneously such that the insert is secured to the backing member. In one embodiment the flange may be in the form of a plate overlying a boundary between the insert and the backing member remote from the co-operating locating means. In this embodiment the flange may be separately connectable to the backing member and insert by any suitable means such that upon disconnection of the flange from the backing member the insert and the flange can together be removed from the backing member.

In another embodiment the insert and the backing member may be located and secured together solely by the wedging action of the co-operating locating means and the secondary locating means. The wedging action may be assisted by gravity when the weight of the insert causes the wedging action to keep the insert and backing member in place. There may further be provided additional securing means such as a biasing means, for example a spring or spring-loaded arm to urge the insert and backing member into the wedging securement. The additional securing means may be one or more bolts or screws which force the insert and backing member together in the direction of slidable engagement of the chamfered faces.

In another aspect of the invention there is further provided insert securing means being connectable to said insert and connectable to said backing member and said insert securing means being separate and remote from said co-operating means; wherein the insert and insert securing means are adapted to be disconnected from the backing member so that they can both be removed therefrom. The insert securing means may be connected to the backing member such that upon disconnection of the insert securing means from the backing member the insert and insert securing means can both be removed at the same time. The insert securing means is preferably connected to the backing member such that upon disconnection of the insert securing means from the backing member the insert and the insert securing means can both be removed therefrom. The insert securing means is optionally directly connected to the insert. For example it may be directly affixed to the insert by means of screws or bolts. Alternatively the insert securing means may be indirectly or remotely connected to the insert, for example by virtue of the insert securing means direct connection or affixation to the backing member it may become connected to the insert. The insert securing means may alternatively be connected to the insert by providing a projection adapted to engage within a recess in part of the wall of the insert or by any other connecting methods as are well known in the art.

The insert securing means may form part of the mould cavity if desired and convenient, depending upon the configuration of the desired mould cavity shape.

In another aspect of the invention there is provided an improved method of mould replacement in a blow moulding apparatus comprising the steps of:

(i) providing a moulding member defining a portion of a mould cavity for blow moulding an article wherein said moulding member includes
   a) a backing member fixable to said blow moulding apparatus and having a wall which defines a recess in said backing member, and
   b) a removable insert located in said recess and having a surface defining a portion of said mould cavity,
   wherein said backing member and insert are located in register relative to each other by way of primary corresponding locating means on said insert and said backing member, (ii) disengaging said primary corresponding locating means and removing said insert from said recess, (iii) positioning a second insert having a surface defining a portion of said mould cavity and having primary locating means corresponding to said locating means of said backing member, in said recess such that said backing member and second insert are positioned in register with each other.

In yet another aspect of the present invention there is provided an improved method of mould replacement in a blow moulding apparatus comprising the steps of:

(i) providing a moulding member defining a portion of a mould cavity, said moulding member comprising:

a) a backing member fixed to said moulding apparatus; and b) a removable insert having a surface defining said portion of said mould cavity, wherein said backing member and insert are positioned in register relative to each other by way of primary corresponding locating means on said backing member and insert and where said backing member and insert are independently connected by fixing means to a securing means;

(ii) disconnecting said fixing means to said backing member and removing together said insert and securing means; and (iii) locating a new insert and new securing means in relation to said backing member about said primary locating means; and (iv) fixing said new securing means to said backing means by said fixing means.

In a preferred embodiment moulding members defining the side walls of a container are changed in this way. A base forming mould member may or may not also be changed.

It will now be convenient to describe the invention with respect to a preferred embodiment illustrated in the accompanying drawings. It is to be understood that the drawings and the following description relate to a preferred embodiment only and are not intended to limit the scope of the invention.

Figures 1, 2, 3:
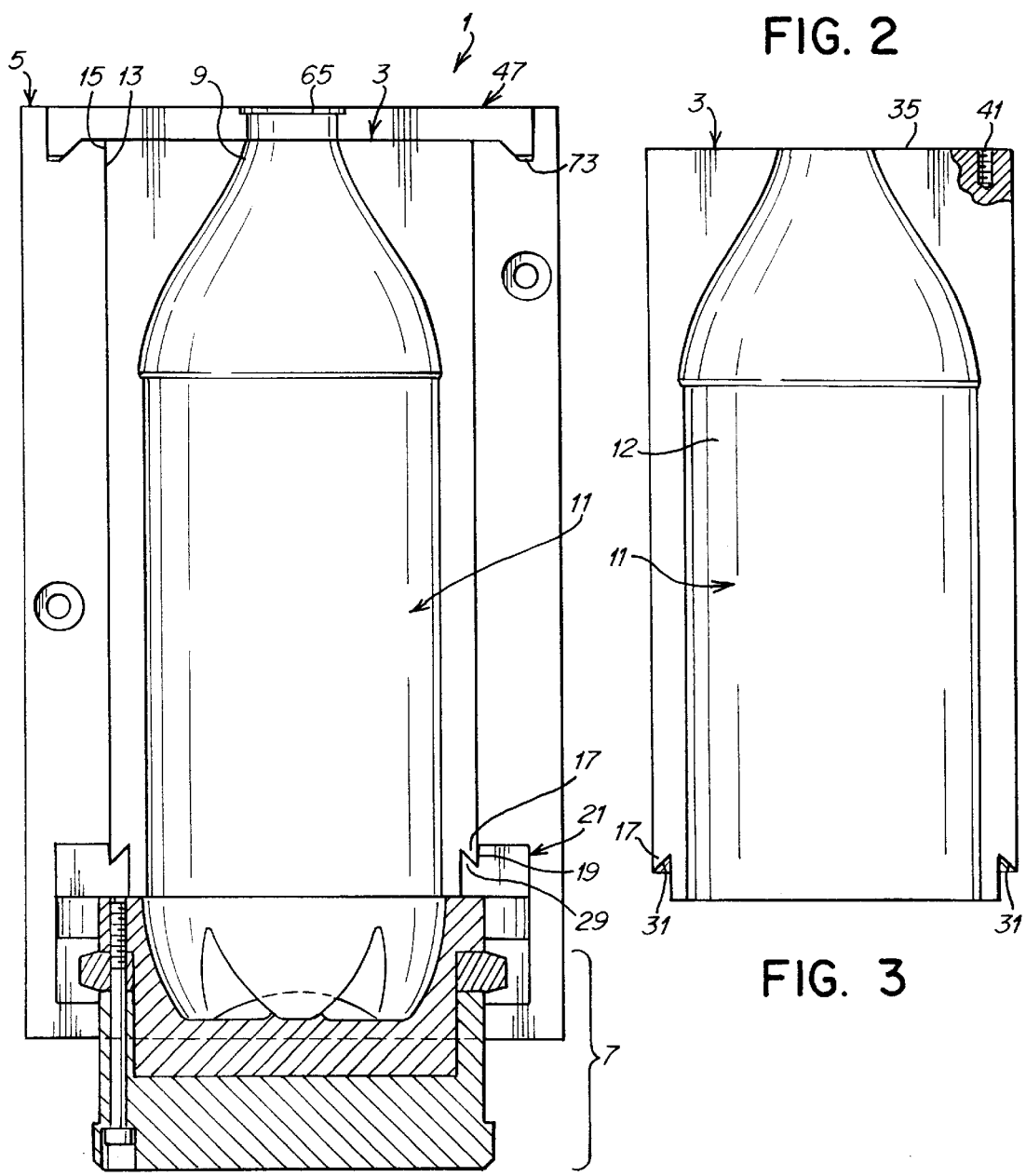
FIG. 1 is an elevation of a mould member of the present invention with a base mould element shown in cross-section.
FIG. 2 is a plan of an insert of the present invention.
FIG. 3 is an elevation of the insert of FIG. 2.

In FIG. 1 mould member 1 consists of an insert 3, a backing member 5 and a base moulding structure collectively show as 7. Mould member 1 is substantially semicircular in cross-section and has an identical counterpart (not shown) with which it cooperates to collectively define a mould cavity corresponding to the side walls of a blown container. The neck finish of a preform is positioned adjacent neck portion 9 and the body of the preform extends into cavity 11. Mould member 1 and its counterpart are each connected to actuating arms of a blow moulding apparatus (not shown) which move the mould members in a reciprocating manner between a closed position in which the mould members and base moulding structure 7 form the complete mould cavity wherein the container is blown, and an open position where the blown container can be ejected and a new preform inserted.

Cavity 11 corresponds in shape to half of the side walls of the container to be formed with surface 12 defining cavity 11. It will be appreciated that with different container configurations it may be preferable to utilise different arrangements of mould members and or different cavity configuration.

Backing member 5 has a semicircular inside surface 13 defining a recess. Insert 3 has a semicircular outside mating surface 15 which is dimension to fit precisely against the inside surface 13.

Figure 6:
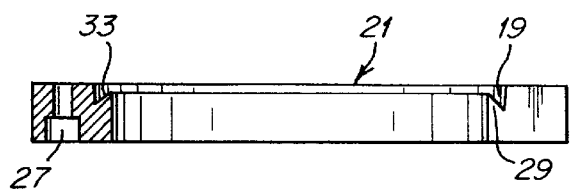
FIG. 6 is an elevation of a separate locating ring of one embodiment of the present invention with the left hand side shown partially in cross-section along the line VI of FIG. 7.
Figure 7:
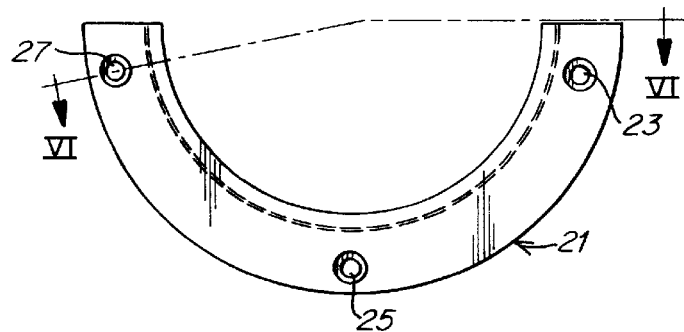
FIG. 7 is a plan of the locating ring of FIG. 6.

Insert 3 has a chamfered projecting rim 17 which cooperates with a semicircular chamfered recess 19 in half-ring 21, which can more clearly be seen in FIG. 6. Half ring 21 is bolted or otherwise secured to backing member 5 by way of bolt holes 23, 25 and 27 so as to essentially become integral with backing member 5. Half ring 21 has a semicircular upward projecting lip or rib 29 which forms undercut recess 19. Angled surfaces 31 and 33 of insert 3 and half ring 21 respectively abut and positively locate insert 3 and backing member 5 together in register when insert 3 is placed against the inside surface 13.

It is preferable for the purposes of easy machining that half ring 21 be made as a separate piece from backing member 5 and then bolted thereto, although the features of half-ring 21 may be made integrally with backing member 5 if desired.

Insert 3 has on an upper surface 35 a plurality of bolt holes 41, 43 and 45 to receive bolts which secure the half plate 47 to insert 3.

Figure 4:
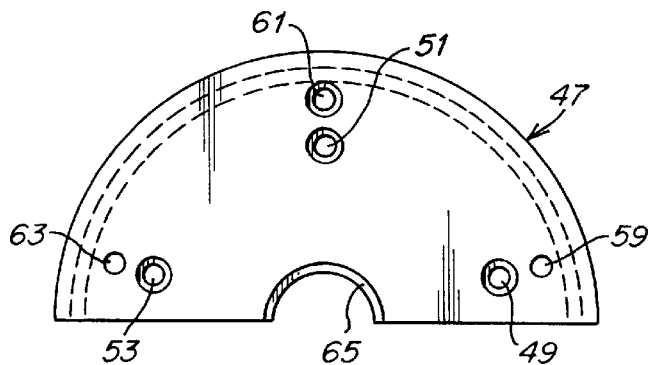
FIG. 4 is a plan of a flange of the present invention shown as a separate element from the insert.
Figure 5:
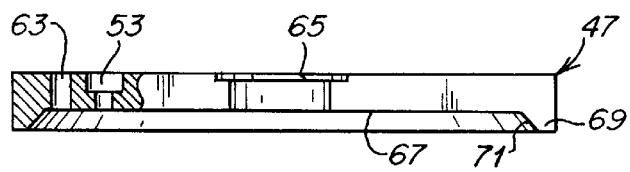
FIG. 5 is an elevation of the flange of FIG. 4 with the left hand side of the flange shown partially in cross-section.

Turning to FIGS. 4 and 5 half plate 47 consists of a semicircular plate adapted to be separately connectable to insert 3 and backing member 5. Half plate 47 has a plurality of apertures 49, 51 and 53 for receiving bolts or similar fastening means to secure half plate 47 to insert 3 at corresponding bolt holes 41, 43 and 45. Half plate 47 also has dowel locating holes 59 and 63 37 and 39 to align half plate 47 with dowels (not shown) in backing member 5 Half plate 47 additionally has aperture 61 adapted to receive a bolt or the like to secure half plate 47 to backing member 5. Half plate 47 has a neck ring locating recess 65 adapted to receive the neck ring of a preform. On the radial periphery of half plate 47 on the surface 67 adapted to abut upper surface 35 there is a downwardly projecting lip 69 having a chamfered inside surface 71 which positively locates in a corresponding recess 73 in backing member 5 such that half plate 47 and backing member 5 are aligned upon assembly.

According to the process of the present invention, after a production run of a particular container shape has been completed and a new container shape is to be manufactured the moulding apparatus is stopped and advanced until a set of mould member are in an open position. Where a new sidewall configuration is to be employed each mould half making up the sidewalls of the blown container must be replaced. The process of replacing each mould half is identical so it is not important which mould half is changed first.

First the securing bolt attaching the half plate 47 to the backing member 5 through bolt hole 61 is removed. The half plate 47 and insert 3 may then be removed upwardly out of engagement with the recess 19 and 73. A substitute insert with the new cavity shape is then simply positioned into the backing members and bottled thereto, with the chamfered projecting rim of the new insert locating in the recess 19 and the projecting lip 69 of the half plate (which is identical to the half plate which has been removed) locating in recess 73 so that the new insert is positioned precisely in register with the backing member 5. The securing bolts are then positioned to fix the half plate to the backing member 5. The same procedure is then followed for the corresponding mould half and for the remaining mould cavities on the apparatus. As the backing members of both mould halves have previously been aligned with each other, it is not necessary for any further adjustment to take place and production may commence once all the necessary mould elements have been replaced.

If a mould insert becomes worn unacceptably it may be removed from the half plate simply by being unbolted. When being machined, the dimensions of the interchangeable mould inserts and half plates must be strictly controlled so that they fit precisely with the backing members.

The components described above may be made from any suitable materials known in the art, and may be made by any suitable process provided that the necessary tolerances are complied with. The half plate may be made from steel or some other relatively hard wearing metal whereas the insert may be made from a softer metal such as aluminium. It will be appreciated however that in one embodiment of the invention the insert and half plate may be integral. The invention may be utilised in both single stage and two stage blow moulding and may be utilised in different types of blow moulding such as stretch blow, moulding or extrusion blow moulding, as will be appreciated by those skilled in the art.

It is to be understood that various modifications, additions or alterations may be made to the arrangements previously described without departing from the ambit of the present invention.

I claim:

1. A moulding member defining a portion of a mould cavity for blow moulding an article in a blow moulding apparatus, wherein said moulding member includes:
   a) a backing member fixable to said blow moulding apparatus and having a wall which defines a recess in said backing member; and
   b) a removable insert located in said recess and having a surface defining a portion of said mould cavity,
   wherein said backing member and said insert are located in register relative to each other by way of co-operating locating members on said insert and said backing member, respectively
   and further including an insert securing member being connectable to said insert and connectable to said backing member and said insert securing member being separate and remote from said cooperating locating members; wherein said insert securing member comprises a plate overlying the boundary between the insert and the backing member; and wherein said insert and insert securing member are adapted to be disconnected from the backing member so that they can both be removed therefrom.

2. A moulding member according to claim 1 wherein said co-operating locating members consist of at least one projecting portion on either of the inner wall of the backing member or on the outer surface of the insert and a corresponding recessed portion on the other of the outer surface of the insert or the inner wall of the backing member such that said projecting portion positively locates in said recess portion.

3. A moulding member according to claim 2 wherein said projecting portion consists of a rib and said recess portion consists of a corresponding groove.

4. A moulding member according to any one of claims 2 to 3 wherein said projecting portion is positioned on said inner wall of said backing member and extends circumferentially about said inner wall and said recessed portion is positioned on the outer surface of the insert.

5. A moulding member according to claim 1 wherein said co-operating locating members are configured such that when said insert and said backing member are located in register relative to each other said insert and backing member are secured to each other by said co-operating locating members.

6. A moulding member according to claim 1 wherein said co-operating locating members comprise interlocking slidably engageable members on said backing member and said insert.

7. A moulding member according to claim 6 wherein said interlocking slidably engageable members comprise a projecting portion and a recessed portion each having a chamfered face such that when said insert and backing member are engaged said chamfered faces wedge upon each other to secure said insert and backing member together.

8. A moulding member defining a portion of a mould cavity for blow moulding an article in a blow moulding apparatus, wherein said moulding member includes:
   a) a backing member fixable to said blow moulding apparatus and having a wall which defines a recess in said backing member; and
   b) a removable insert located in said recess and having a surface defining a portion of said mould cavity, wherein said backing member and said insert are located in register relative to each other by way of co-operating locating members on said insert and said backing member, respectively
   and further including an insert securing member being connectable to said insert and connectable to said backing member and said insert securing member being separate and remote from said cooperating locating members; the insert securing member including a flange provided with a secondary locating member for locating in a recess in said backing member; and wherein said insert and insert securing member are adapted to be disconnected from the backing member so that they can both be removed therefrom.

9. A moulding member according to claim 8 wherein said flange secures said insert within said backing member by way of a projection on said flange which has a chamfered face located within a corresponding groove in said backing member having a chamfered face such that said chamfered faces wedge upon each other to secure and locate said flange into said groove.

10. A moulding member according to any one of claims 8 to 9 wherein said insert and backing member are located and secured together solely by said co-operating locating members and secondary locating member.

11. A moulding member according to claim 1 wherein said insert securing member is connected to said backing member such that upon disconnection of said insert securing member from said backing member the insert and insert securing member can both be removed therefrom.

12. A moulding member according to claim 1 wherein said insert securing member is directly connected to said backing member.

13. A moulding member according to claim 8 wherein said insert securing member comprises a plate overlying the boundary between the insert and the backing member.

14. A moulding member defining a portion of a mould cavity for blow moulding an article in a blow moulding apparatus, wherein said moulding member includes:
   a) a backing member fixable to said blow moulding apparatus and having a wall which defines a recess in said backing member; and
   b) a removable insert located in said recess and having a surface defining a portion of said mould cavity, wherein said backing member and said insert are located in register relative to each other by way of co-operating locating members on said insert and said backing member, respectively and further including an insert securing member being connectable to said insert and connectable to said backing member and said insert securing member being separate and remote from said cooperating locating members; wherein said insert securing member is fixed to said backing member by one or more screws or bolts; and wherein said insert and insert securing member are adapted to be disconnected from the backing member so that they can both be removed therefrom.

15. A blow moulding apparatus including a plurality of mould members movable in a reciprocating manner between a closed position in which said mould members collectively define a mould cavity for blow moulding an article and an open position for ejecting a moulded article and receiving a preform, wherein one or more of said moulding members consist of a moulding member according to claim 1.

16. A moulding member defining a portion of a mould cavity for blow moulding an article in a blow moulding apparatus, said moulding member comprising:

a) a backing member fixed to said moulding apparatus; and b) a removable insert having surface defining a portion of said mould cavity, wherein said backing member and insert are positioned in register relatively to each other by way of co-operating locating members on said insert and said backing member, and further including an insert securing member to connect said insert and backing member, said insert securing member comprising a plate overlying the boundary between the insert and the backing member, said insert securing member being connectable to said insert and connectable to said backing member and said insert securing member being separate and remote from said co-operating locating members and capable of being connected to both the backing member and insert simultaneously such that the insert is secured to the backing member; wherein the insert and insert securing member are adapted to be disconnected from the backing member so that they can both be removed therefrom.

17. A moulding member according to claim 16 wherein said insert securing member is connected to said backing member such that upon disconnection of said insert securing member from said backing member the insert and insert securing member can both be removed therefrom.

18. A moulding member according to claim 17 wherein said insert securing member is directly connected to said backing member.

19. A moulding member defining a portion of a mould cavity for blow moulding an article in a blow moulding apparatus, said moulding member comprising:

a) a backing member fixed to said moulding apparatus; and b) a removable insert having surface defining a portion of said mould cavity, wherein said backing member and insert are positioned in register relatively to each other by way of co-operating locating members on said insert and said backing member, and further including an insert securing member to connect said insert and backing member, said insert securing member being connectable to said insert and connectable to said backing member, wherein said insert securing member is fixed to said backing member by one or more screws or bolts, and said insert securing member being separate and remote from said co-operating locating members and capable of being connected to both the backing member and insert simultaneously such that the insert is secured to the backing member; wherein the insert and insert securing means are adapted to be disconnected from the backing member so that they can both be removed therefrom.

20. A blow moulding apparatus including a plurality of mould members movable in a reciprocating manner between a closed position in which said mould members collectively define a mould cavity for blow moulding an article and an open position for ejecting a moulded article and inserting a preform wherein one or more of said moulding member consists of a moulding member according to claim 16.

21. A moulding member defining a portion of a mould cavity for blow moulding an article in a blow moulding apparatus wherein said moulding member comprises:

a) a backing member fixed to said moulding apparatus; and b) a removable insert having a surface defining a portion of said mould cavity, wherein said backing member and insert are positioned in register relatively to each other by way of co-operating locating members on said insert and said backing member, and further including an insert securing member which can be directly connected to said backing member and can also be connected to said insert independent of said connection to said backing member, said insert securing member being remote from said co-operating locating members and where upon disconnection of said insert securing member from said backing member said insert and said insert securing member can be removed from said backing member whilst said insert and insert securing member are still connected.

22. A moulding member according to claim 21 where the insert and the backing member are urged into register by way of said locating members when said insert is secured to said backing member by said insert securing member.

23. A moulding member according to either one of claims 21 or 22 wherein said insert securing member and said backing member include secondary locating members to bring said insert and backing member into register.

24. A moulding member according to claim 21 wherein said primary locating members consist of interlocking semi annular chamfered flanges of complementary dimensions.

25. A moulding member according to claim 21 wherein said secondary locating members consist of interlocking chamfered members of complimentary dimensions.

26. A blow moulding apparatus including a plurality of mould members movable in a reciprocating manner between a closed position in which said mould members collectively define a mould cavity for blow moulding an article and an open position for ejecting a moulded article and inserting a preform wherein one or more of said moulding member consists of a moulding member according to claim 21.

27. A method of mould replacement in a blow moulding apparatus comprising the steps of:

(i) providing a moulding member defining a portion of a mould cavity, said moulding member comprising:
   a) a backing member fixed to said moulding apparatus; and
   b) a removable insert having a surface defining said portion of said mould cavity,
   wherein said backing member and insert are positioned in register relative to each other by way of primary corresponding locating members on said backing member and insert and where said backing member and insert are independently connected by a fixing member to a securing member;

(ii) disconnecting said fixing member to said backing member and removing together said insert and securing member; and (iii) locating a new insert and new securing member in relation to said backing member about said primary locating members; and (iv) fixing said new securing member to said backing member by said fixing member.

* * * * *